United States Patent [19]

Brooks, Jr. et al.

[11] Patent Number: 4,611,919
[45] Date of Patent: Sep. 16, 1986

[54] PROCESS MONITOR AND METHOD THEREOF

[75] Inventors: Edward A. Brooks, Jr.; Roger M. Bithell, both of Novato, Calif.

[73] Assignee: Tegal Corporation, Novato, Calif.

[21] Appl. No.: 588,028

[22] Filed: Mar. 9, 1984

[51] Int. Cl.⁴ .............................................. G01B 9/02
[52] U.S. Cl. .................................... 356/357; 156/626
[58] Field of Search ...................... 356/357, 369, 382; 156/626, 627

[56] References Cited

U.S. PATENT DOCUMENTS

| 4,198,261 | 4/1980 | Busta et al. | 156/626 |
| 4,208,240 | 6/1980 | Latos | 156/627 |
| 4,454,001 | 6/1984 | Sternheim et al. | 156/626 |
| 4,462,860 | 7/1984 | Szmanda | 156/626 |

OTHER PUBLICATIONS

Bennett et al., "Selective and Directional Etching of Polysilicon and WSi₂", IBM Tech. Disclo. Bull., vol. 25, No. 1, pp. 33-34, 6/82.

Primary Examiner—Davis L. Willis
Assistant Examiner—Matthew W. Koren
Attorney, Agent, or Firm—Paul F. Wille; Jonathan P. Meyer

[57] ABSTRACT

A process monitor which is particularly useful for endpoint detection in plasma etching processes does not require the dedication of a test area on the wafer for endpoint detection and also obviates the need for wafer alignment. An improved optical window which does not significantly perturb the RF fields in the plasma chamber is also disclosed. The apparatus reflects laser energy off an area of the wafer comparable to the area of a typical die and extracts the necessary information from the resulting waveform by means of first and second time derivatives.

10 Claims, 4 Drawing Figures

PROCESS MONITOR AND METHOD THEREOF

FIELD OF THE INVENTION

The present invention relates, in general, to process monitors for use in monitoring and controlling plasma processes and the like. More particularly, the invention relates to a laser process monitor which provides improved endpoint detection in plasma etching processes and requires no special alignment of the article being etched.

BACKGROUND OF THE INVENTION

Plasma etching and related processes such as reactive ion etching are becoming increasingly important in the field of semiconductor device manufacture. In general, these processes involve the exposure of one or more wafers containing a number of semiconductor devices to a chemical atmosphere which has been ionized by the application of RF energy. The usual goal of such processes is to remove exposed portions of an underlying layer while leaving an overlying layer which is usually a patterned photoresist.

As the feature size of devices manufactured by these processes becomes smaller, it becomes increasingly necessary to accurately define the endpoint of the process; that is, the point at which the desired portions have been removed. One method of performing endpoint detection is generally referred to as laser endpoint and involves the illumination of a predetermined portion of the wafer with energy from a laser and the analysis of the reflected energy.

As is disclosed in U.S. Pat. Nos. 4,198,261 and 4,208,240, both issued to Gould, Inc., laser endpoint detection is fundamentally an interferometric technique. The multiple reflections caused by the several layers with different indices of refraction create interference fringes which can be counted as the thickness of the layers change. While this has been well known for some time, laser endpoint detection has been used to a limited extent because of the necessity of devoting space on the wafer to serve as the test area and of aligning the wafer so that the test area coincides with the spot illuminated by the laser. In order to make sense of the signal carried by the reflected energy, prior art laser endpoint detectors need a test area in which only the layer which is to be etched away is present, with no overlying photoresist or masking layers.

The requirement of a test area and the necessity of alignment have also prevented the use of laser endpoint in the more general sense of a process monitor. For instance, if several laser endpoint detectors were used, say one at the center of the wafer and one near the edge, it would be possible to monitor the uniformity of the process across the wafer and to make changes in the process conditions if necessary.

Finally, laser endpoint detection has the drawback of requiring an optical window in close proximity to the wafer. In the popular parallel plate-type plasma reactors, the window must be placed in one of the electrodes which is used to excite the plasma. This often results in a discontinuity in the RF field in the region of the window and a differential etch rate for the test region of the wafer.

SUMMARY OF THE INVENTION

Accordingly, it is an object of the present invention to provide an improved laser process monitor and method thereof for use in plasma processes and the like.

It is a further object of the invention to provide a laser endpoint detector and process monitor and method thereof which does not require a test area on the wafer being processed.

Yet a further object of the present invention is to provide a laser endpoint detector and method which is suitable for use as a uniformity etch rate and selectivity monitor.

Still a further object of the invention is to provide a laser endpoint detector which does not produce a substantial perturbation in the RF field of a plasma reactor apparatus.

A particular embodiment of the present invention comprises a laser endpoint detector which illuminates both the overlying photoresist or masking layer and the exposed underlying layer and collects reflected energy therefrom. An analog signal is generated by means of a photodiode. The analog signal typically has a low frequency, large amplitude periodic component representing the removal rate of the photoresist and a superposed higher frequency, lower amplitude periodic component representing the removal rate of the underlying layer. This analog signal is analyzed by means of first and perhaps second time derivatives thereof so that maxima of the higher frequency component may be identified. These maxima correspond to points in time in the process at which an integral relationship between the laser wavelength and the thickness of the underlying layer exists. Knowledge of the original thickness of the layer being etched allows either automatic or operator-controlled halting of the process at endpoint.

Another aspect of the invention comprises an improved optical window for laser endpoint detection. An optically transparent saphire rod is placed in the upper electrode of a parallel plate-type reactor. A thinned portion of the electrode separates the end of the rod from the reaction chamber. The thinned portion has a number of holes to allow the transmission of the laser energy without substantially degrading the electrical characteristics of that portion of the electrode. An optical fiber bundle adjacent to the backside of the rod carries energy to and from the rod and is provided with a vacuum feed-through to maintain the vacuum level in the chamber and other portions of the apparatus.

Another disclosed embodiment of the invention comprises a process monitor in which one laser endpoint detector is located at the center of the chamber and others are located as necessary to be near the edge of any of the several wafer sizes in common use. This arrangement allows the use of either center or edge endpoint detection for any size wafer and also provides the possiblity of early detection of non-uniformities across the wafer.

These and other objects and advantages of the present invention will be apparent to one skilled in the art from the detailed description below taken together with the drawings.

DETAILED DESCRIPTION OF THE INVENTION

Figure 1:
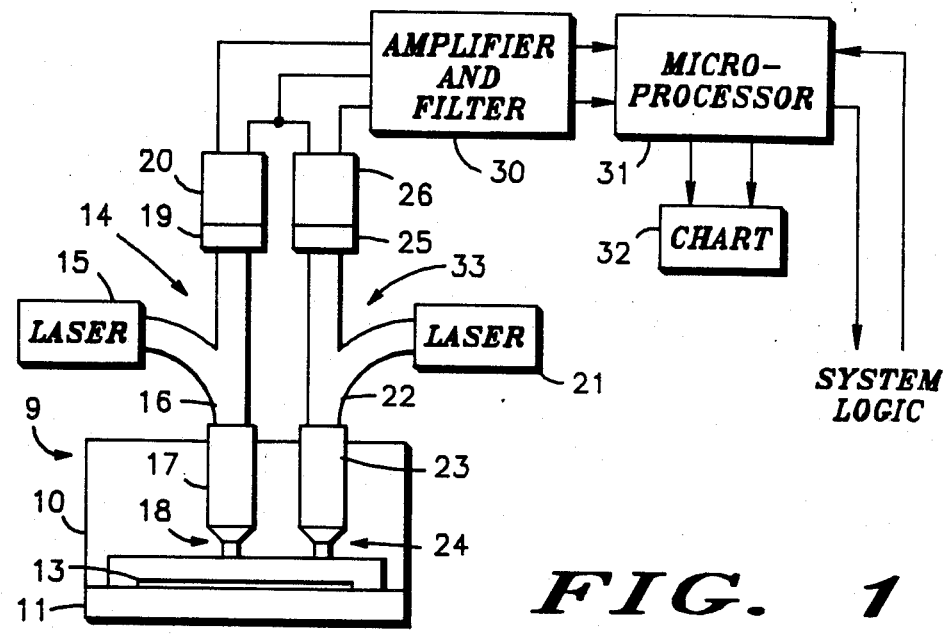
FIG. 1 is a schematic view of a two-point laser endpoint and process monitor according to the principles of the present invention.

FIG. 1 illustrates the principles of the present invention embodied in a two-point laser endpoint detection apparatus for use in plasma etching reactors. A parallel plate-type plasma reactor 9 comprises an upper electrode 10 and a lower electrode 11 which combine to define a reaction chamber 12. A plasma process is performed on a semiconductor wafer 13 by supplying a relatively low pressure reactive gas to chamber 12 and ionizing it by applying RF energy betweeen electrodes 10 and 11.

A first laser endpoint sensor apparatus 14 comprises a laser 15, a randomly oriented, bifurcated optical fiber bundle 16, a vacuum feed-through 17, an optical window 18, an optical filter 19 and a photodiode 20. Coherent electromagnetic energy emitted by laser 15 enters optical fiber bundle 16 and is projected onto the surface of wafer 13 through optical window 18. Vacuum feed-through 17 serves to allow passage of optical window 18 through upper electrode 10 while preserving the sealed condition of chamber 12. Optical window 18 and vacuum feed-through 17 are discussed in greater detail with regard to FIG. 2.

Unlike prior art laser endpoint systems, the present invention does not require that a particular portion of wafer 13 be illuminated by the laser energy. Prior art systems require that only the underlying layer be illuminated, thus requiring the dedication of a portion of the wafer as a test area with no useable die. The present invention assumes that the laser energy will illuminate both the overlying photoresist and an exposed portion of the underlying layer which is being etched. This is described in greater detail with reference to FIG. 3.

Laser energy reflected from the surface of wafer 13 is collected by optical window 18 and re-enters optical fiber bundle 16. This energy is coupled, through optical filter 19 which has passband centered about the frequency of laser 15, to photodiode 20. Photodiode 20 converts the optical energy to an analog electrical signal which has a voltage related to the instantaneous intensity of the optical energy. Other devices such as photo-multiplier tubes may be substituted for photodiode 20. As is discussed with reference to FIGS. 3 and 4, this electrical signal carries information from which an endpoint determination can be made.

A second laser endpoint sensor apparatus 33, comprising a laser 21, a randomly oriented, bifurcated optical fiber bundle 22, a vacuum feed-through 23, an optical window 24, an optical filter 25, and a photodiode 26, is essentially identical to first sensor apparatus 14. First sensor apparatus 14 is arranged to cover a central portion of wafer 13 while second apparatus 33 is arranged to cover a region near the edge of wafer 13. While complete uniformity of the etch rate across the wafer is the ideal, it is seldom realized. This allows the flexibility of determining the process endpoint from either the center of the wafer or the edge, or even of compromising between the two. Additionally, if extremely fine process control is available, it is possible to compare the signals obtained from the center and edge sensors in order to identify and correct non-uniformities.

The two-point system disclosed can be easily extended to include a central sensor and several edge sensors arranged so that an appropriate edge region will be covered no matter which of the several common sizes of wafers are being processed. The consumption of wafer area required by prior art laser endpoint systems would normally preclude the use of a two-point endpoint detector. In addition, the magnitude of the alignment problem would be greatly magnified in a system having more than one sensor. Of course, the present invention also provides significant advantages even if only a single endpoint sensor apparatus is utilized.

The analog signals from photodiodes 20 and 26 are processed by an amplifier and filter apparatus 30 to provide a suitably "clean" and powerful signal. It is found that components of the analog signal with frequencies above approximately 1 Hz are mostly noise and should be eliminated by the filter. The signals are then passed to a microprocessor board 31 which performs the analysis necessary to extract the endpoint information from the signals. This is discussed in greater detail below. In general, the signals are then coupled to a dual trace chart recorder 32 to generate a lasting record of the process run and to allow real-time operator monitoring. In some cases, the operator may actually count zero-crossings of the charted signals to determine the endpoint and manually terminate the process.

In many cases, the microprocessor will be configured to perform the endpoint detection process automatically and to terminate the process by means of an interface with the system logic which is controlling the reactor apparatus.

Figure 2:
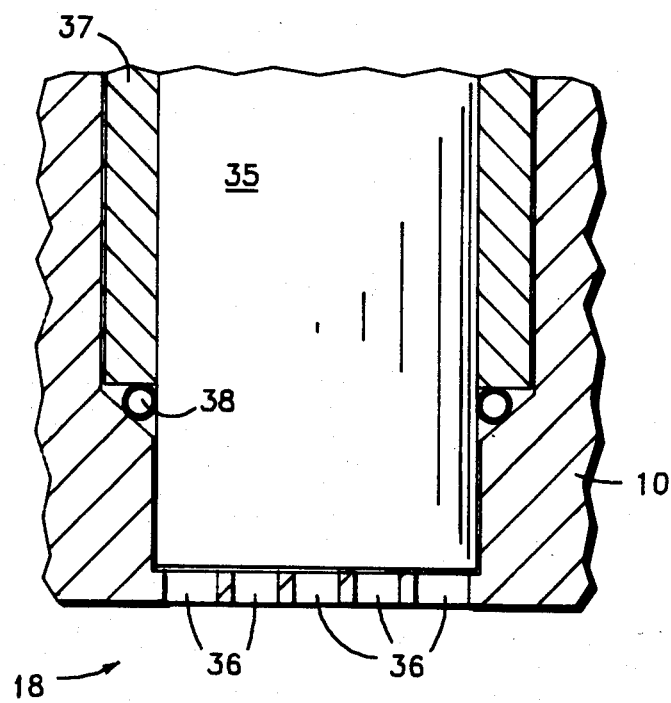
FIG. 2 is an enlarged view of an optical window according to the principles of the present invention.

Referring now to FIG. 2, the details of optical window 18 are described. Window 18 must be disposed in upper electrode 10 of the reactor apparatus in fairly close proximity to the wafer. In prior art laser endpoint systems, this has led to discontinuities in the RF fields near the window and a resulting differential etch rate on the very portion of the wafer which is being used for endpoint detection. In the particular embodiment of the present invention illustrated in FIG. 2, window 18 comprises a saphire rod 35 disposed in upper electrode 10. Saphire is chosen to withstand exposure to the plasma without significant degradation. An end of saphire rod 35 abuts a thinned portion of electrode 10 in which a number of small holes 36 are drilled. In one particular case, saphire rod 35 is approximately one-quarter inch in diameter and holes 36 are approximately 0.040 inches in diameter. Holes 36 are disposed in a roughly hexagonal array over the thinned portion of electrode 10. It is found that such an arrangement allows adequate illumination of the wafer while maintaining the electrical characteristics of that portion of electrode 10 so as not to perturb the RF fields.

At a location not included in FIG. 2, saphire rod 35 is abutted against the optical fiber bundle. A tube 37 covers saphire rod 35 and perhaps a portion of the optical fiber bundle and provides a means for sealing the apparatus against vacuum. For instance, O-ring 38 disposed between the end of tube 37 and upper electrode 10 provides such a seal. As is well known, upper electrode 10 may have various cavities which act as gas manifolds and tube 37 may be sealed at each such interface.

Figure 3:
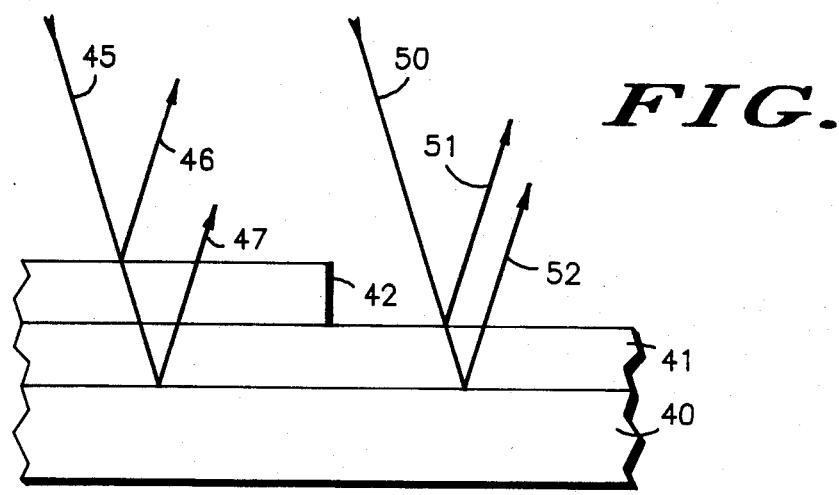
FIG. 3 is a simplified cross-sectional view of a semiconductor device to illustrate the principles of the present invention.
Figure 4:
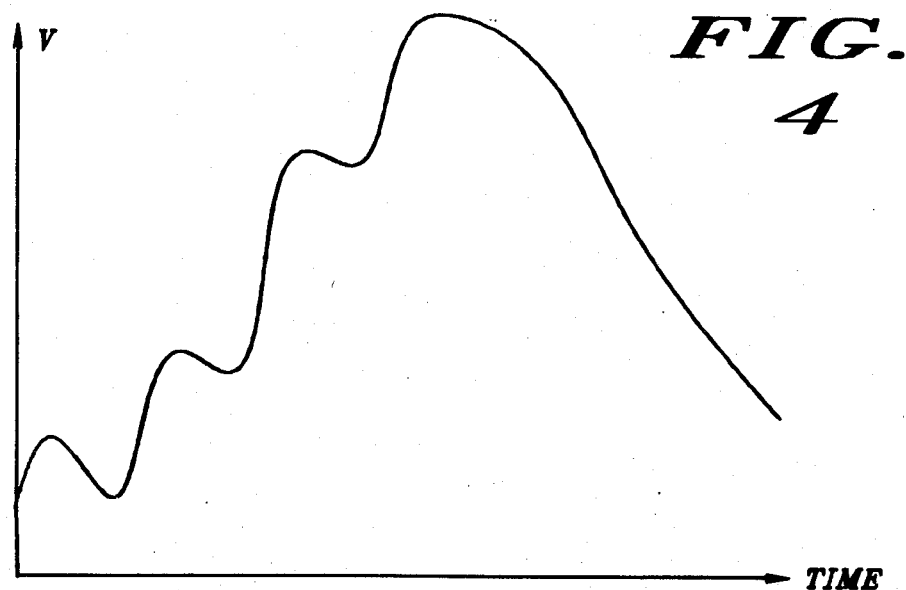
FIG. 4 is a graph of voltage versus time representing a typical analog signal of the present invention.

Referring now to FIGS. 3 and 4, the details of the operation of the laser endpoint detector and process monitor according to the present invention are discussed. FIG. 3 depicts a cross-section of a portion of a semiconductor device undergoing a plasma etching process or the like. This portion of the device comprises a foundation layer 40, an underlying layer 41, which is the layer being etched, and an overlying photoresist or masking layer 42 which covers a portion of layer 41 and substantially protects that portion from etching. Since the optical window "looks at" an area of the wafer comparable in size to the size of a single die, it is guaranteed to "see" both photoresist layer 42 and underlying layer 41.

Energy from the laser is projected from the optical window onto the wafer at nearly normal incidence. This has been distorted here to more clearly depict the incident and reflected energy. A portion of the laser energy falls on photoresist layer 42, as depicted by ray 45. Since an index of refraction discontinuity exists at the upper surface of layer 42, a portion of the energy is reflected, as depicted by ray 46. A further portion of the energy is passed through layers 42 and 41 to be reflected from the surface of foundation 40, as depicted by ray 47. The effects of refraction in layers 41 and 42 and reflection from layer 41 are ignored here. A phase difference exists between rays 46 and 47 which is a function of the thickness of layers 41 and 42 and their indices of refraction. Therefore, inteference will occur, producing either greater or lesser intensity of the total reflected energy depending on the magnitude of the phase difference.

The same description applies to the portion of the laser energy falling on exposed portions of layer 41, as depicted by rays 50, 51 and 52. Interference arises between rays 51 and 52 and produces either greater or lesser intensity, depending on the thickness and index of refraction of layer 41.

Since the thickness of layer 41 is decreasing as the etch process continues, the intensity of the energy reflected therefrom will undergo a periodic variation, which is commonly described as the movement of interference fringes. As is well known, this periodic variation has the mathematical form of a cosine squared, with minima and maxima of the waveform correspondig to points in the process at which an integral relation between the thickness of layer 41 and the wavelength of the laser energy obtains.

Although photoresist layer 42 is ideally impervious to the etch process, this is never the case, so the thickness of layer 42 is also changing. This also produces a cosine squared variation in the intensity of the reflected energy. As is apparent, the frequency of the periodic term corresponding to the etching of photoresist layer 42 is generally lower than the frequency of the term corresponding to the etching of underlying layer 41. The difference in frequency between these two periodic terms is related to the selectivity of the etch process; that is, the degree to which the process etches the intended layer faster than the photoresist layer.

The other major factor which affects the intensity of the reflected energy is percent of the surface area of the wafer which is covered with photoresist. This percentage is nearly always greater than 50% and may be 90% or more. This means that the amplitude of the low frequency term corresponding to energy falling on photoresist layer 42 is greater than the amplitude of the higher frequency term corresponding to energy falling on underlying layer 41.

FIG. 4 is a graph depicting the voltage waveform of an analog signal whose voltage is proportional to the total intensity of the energy reflected from the wafer as the etch process is in progress. The waveform is essentially the superposition of two cosine squared terms, one of low frequency and large amplitude and one of higher frequency and smaller amplitude. This graph is the result of a simulation of a process having a selectivity of approximately 4:1 in which the wafer is 80% covered by photoresist.

An analog waveform of the type depicted in FIG. 4 is output by each of the photodiodes of the apparatus described with reference to FIG. 1. The purpose of the endpoint detection scheme is to detect the point at which the layer being etched is completely removed, without substantially attacking the substrate. While many processes require some over-etching past this endpoint, the definition of the endpoint is the same. In the analog signal produced by the photodiodes, this endpoint corresponds to the final maximum of the higher frequency cosine squared component.

Identification of this point in the analog waveform can be done either automatically or by an operator observing the waveform on a chart recorder. In either case, at least the first time derivative of the analog waveform must be observed. The generation of the time derivative takes place in the microprocessor logic. In fact, the signal generated is not exactly equal to the time derivative, but it is a close approximation calculated by dividing the change in the waveform over a small span of time by the time span.

The purpose of observing the time derivative of the waveform is to identify its maxima by means of the zero-crossing points in the time derivative. Ideally, each maxima of the waveform corresponds exactly with a zero-crossing of the first time derivative. Of course, various factors combine to complicate this. First, noise on the waveform makes zero-crossings difficult to identify precisely. The standard technique of setting a threshold which must be crossed, either positively or negatively, between each detected zero-crossing is useful in avoiding false detections due to noise. This is easily accomplished on the microprocessor board.

The other major complication arises due to the relative amplitudes of the two periodic components of the waveform. In cases involving a very high percentage of photoresist in the illuminated area of the wafer, the low frequency component of the waveform may tend to overwhelm the high frequency component. In this case, the first time derivative may not cross zero when the high frequency component peaks. This problem may be overcome by examining the second time derivative of the waveform. This will provide the identifiable peaks or zero-crossings necessary to firmly identify the maxima of the original waveform.

In the preferred embodiment of the present invention, the microprocessor board provides both first and second time derivatives to the chart recorder for operator monitoring. In practice, a test wafer of a particular batch is etched well past endpoint and the chart recorder output is used to identify which zero-crossing of the first derivative or corresponding point on the second derivative will be used to identify the proces endpoint. The operator then has the option of instructing the microprocessor board to automatically terminate the process after identifying a certain number of reference points of the first or second derivative, to etch a certain time past the identified endpoint, or to simply etch until the operator identifies the desired endpoint manually and terminates the process.

Various modifications to this scheme of operation will be apparent to one skilled in the art. For instance, the need to run a test wafer may be avoided if one knows the thickness of the film to be etched, it is possible to calculate the number of maxima which will be observed in the waveform prior to endpoint from the principles of interferometry in thin films.

In the preferred embodiment disclosed herein, two endpoint sensors are utilized to allow endpoint detection at either the center or the edge of the wafer. While this is a desireable situation, it is not necessary to the operation of the invention and the second sensor may be removed. Other possible modifications include the use of more sophisticated microprocessor logic to compare the waveforms from the two sensors and identify non-uniformities or other problems with the process flow. It is also possible to extract such information as the etch rates from the waveforms.

While the present invention was described with reference to an application in which a photoresist layer immediately overlies the layer to be etched, such need not be the case. Layers may intervene between the photoresist and the layer being etched without fundamentally altering the endpoint detection process except that the intensity of the energy reflected from the lower layers will decrease. Furthermore, additional layers may underlie the layer being etched without altering the process.

The present invention provides an improved apparatus and method for laser endpoint detection in plasma etching processes and the like. The invention obviates the need to align the wafer in a particular manner in the plasma chamber and the need to dedicate a test area of the wafer to endpoint detection. In addition, a means is disclosed to avoid the discontinuities caused by the optical windows employed by prior art laser endpoint detectors. The present invention provides the means by which laser endpoint detection can be extended into areas of process monitoring including multiple endpoint detection and uniformity monitoring.

We claim:

1. Apparatus for monitoring the change in thickness of an article in at least a portion of one surface thereof while that surface is subjected to a process, said apparatus comprising:
   means for illuminating a portion of said surface with coherent electromagnetic energy;
   means for detecting a portion of the energy reflected from said surface and for producing an electrical signal proportional thereto;
   means for identifying points in said electrical signal corresponding to points in said process at which a particular relationship obtains between said thickness and the wavelength of said coherent energy;
   means for altering said process upon identifying a certain number of said points, and
   means for generating a second signal, proportional to the first derivative with respect to time of said electrical signal, and wherein said means for identifying utilizes said second signal for identifying said points.

2. The apparatus as set forth in claim 1 wherein said means for illuminating comprises:
   a first window through which incident and reflected electromagnetic energy passes;
   a second window through which incident and reflected electromagnetic energy passes; and
   wherein said detecting means comprises first and second photodetectors optically coupled one to each of said windows.

3. The apparatus as set forth in claim 2 wherein said altering means further comprises means responsive to differences in signals from said photodetectors.

4. The apparatus as set forth in claim 3 and further comprising a plasma reactor having at least one conductive electrode for containing said windows.

5. The apparatus as set forth in claim 4 wherein said windows comprise:
   a reduced thickness portion in one of said electrodes;
   a plurality of holes in the reduced thickness portion; and
   an optically transparent, electrically conductive material covering said holes and sealed into said reduced thickness portion.

6. The apparatus as set forth in claim 5 and further comprising:
   an optical fiber bundle interconnecting said window, said detecting means, and said illuminating means.

7. The apparatus as set forth in claim 6 wherein said optical fiber bundle is divided between said illuminating means and said detector means at one end and wherein the other end of substantially all of the fibers in said bundle is coupled to said window.

8. A method for monitoring the change in thickness of an article, subjected to a process which acts upon at least one surface of said article, comprising the steps of:
   illuminating a portion of said surface with coherent radiation;
   detecting radiation reflected from said surface and producing an analog signal proportional thereto;
   wherein said illuminating detecting steps are carried out at more than one location on said surface to produce several analog signals; and
   identifying points in said analog signals indicative of predetermined changes in thickness.

9. The method as set forth in claim 8 and further comprising the step of:
   varying said process to reduce variations in thickness as indicated by said analog signals.

10. A plasma etch process monitor comprising:
    means for illuminating with coherent electromagntic energy a semiconductor wafer; said means including a first optical window for illuminating a central portion of said wafer and to collect energy reflected therefrom and a second optical window for illuminating an edge portion of said wafer and to collect energy reflected therefrom;
    means for generating analog signals related to the intensity of the energy reflected from said central portion and the edge portion of said wafer, respectively; each analog signal having superposed large and small amplitude components;
    means for identifying maxima of said small amplitude periodic component; and
    means for altering said etch process upon identifying a certain number of said maxima.

* * * * *